United States Patent [19]
Watanabe et al.

[11] Patent Number: 5,968,677
[45] Date of Patent: Oct. 19, 1999

[54] FERROMAGNETIC MATERIAL AND MAGNETIC APPARATUS EMPLOYING THE FERROMAGNETIC MATERIAL

[75] Inventors: Satoshi Watanabe, Wako; Toshiyuki Onogi, Higashimatsuyama; Masahiko Ichimura, Hiki-gun; Yoshimasa Ono, Mito; Tomihiro Hashizume, Hiki-gun; Yasuo Wada, Bunkyo-ku, all of Japan

[73] Assignee: Hitachi, Ltd., Tokyo, Japan

[21] Appl. No.: 08/993,196

[22] Filed: Dec. 18, 1997

[30] Foreign Application Priority Data

Dec. 18, 1996 [JP] Japan ................................. 8-337953
Jan. 23, 1997 [JP] Japan ................................. 9-009970
Feb. 4, 1997 [JP] Japan ................................. 9-021229

[51] Int. Cl.$^6$ ........................................... G11B 5/66
[52] U.S. Cl. ............... 428/692; 428/694 T; 428/694 TS; 428/694 TR; 428/694 ST; 428/900; 360/113; 324/252
[58] Field of Search ................................. 428/632, 694 T, 428/694 TS, 694 TR, 694 ST, 900; 360/113; 324/252

[56] References Cited

U.S. PATENT DOCUMENTS 5,561,300 10/1996 Wada et al. ........................... 250/492.2

OTHER PUBLICATIONS

S. Watanabe "Theoretical Study of Ga Adsorbates Around Dangling–Bond Wires on an H–Terminated Si Surface: Possibility of Atomic–Scale Ferromagnets" Jpn. J. Appl. Phys. vol. 36 (1997) pp. L929–L932 Part 2, No. 7B, Jul. 15, 1997.

Hashizume, et al., Interaction of Ga Adsorbates with Dangling Bonds on the Hydrogen Terminated Si(100) Surface, Japanese Journel Applied Physics Letters, vol. 35, pp. 1085–1088 (1996).

Fujita et al., "Peculiar Localized State at Zigzag Graphite Edge", Journal of Physical Society of Japan, vol. 65, pp. 1920–1923 (1996).

Hashizume et al., "Interaction of Ga Adsorbates with Dangling Bonds on the Hydrogen Terminated Si(100) Surface", Japanese Journal Applied Physics Letters, vol. 35, pp. 1085–1088 (1996).

Eigler et al., "Positioning Single Atoms with a Scanning Tunnelling Microscope", Nature, vol. 344, Apr. 5, 1990, pp. 524–526.

Chou et al., "Single–domain Magnetic Pillar Array of 35nm Diameter and 65 Gbits/in.$^2$ Density for Ultrahigh Density Quantum Magnetic Storage", Journal of Applied Physics, vol. 76, pp. 6673–6675 (1994).

Kent et al., Properties and Measurement of Scanning Tunnelling Microscope Fabricated Ferromagnetic Particle Arrays (invited), Journal of Applied Physics, vol. 76, pp. 6656–6660 (1994).

Tokyo Daigaku Bussei Kenkyu–jo, "Bussei Kagaku Jiten", pp. 198–200, Tokyo Shoseki (1996).

Primary Examiner—Leszek Kiliman
Attorney, Agent, or Firm—Antonelli, Terry, Stout & Kraus, LLP

[57] ABSTRACT

A ferromagnetic material can be formed in a very small size on the order of an atomic size and is capable of being stably magnetized. The ferromagnetic material comprises basic unit structures each consisting of a first atom (11), a second atom (12) of the same kind as the first atom (11), and a third atom (or atomic group) (13) of the same kind as the first atom (11) or of a kind different from that of the first atom (11). In each of the basic unit structures, the atoms are arranged on a surface of a substrate so that a chemical bond (14) is formed between the first atom or and the third atom or molecule, a chemical bond (14) is formed between the second atom and the third atom or molecule, a chemical bond or an electron path (15) not passing the third atom is formed between the first and the second atom.

26 Claims, 14 Drawing Sheets

FERROMAGNETIC MATERIAL AND MAGNETIC APPARATUS EMPLOYING THE FERROMAGNETIC MATERIAL

BACKGROUND OF THE INVENTION

The present invention relates to a ferromagnetic material having a wide range of application in technical fields, and magnetic apparatuses including high-density magnetic recording apparatuses and magnetic sensors and employing such a ferromagnetic material.

A ferromagnetic material is a substance having spontaneous magnetization, i.e., a substance having a finite magnetization intensity. Sometimes, a ferromagnetic material in bulk does not display any finite magnetization intensity. In such a state, the interior of the ferromagnetic material is divided into a plurality of regions, each of the regions displays magnetization of a finite intensity, and the directions of magnetization of the regions are different from each other. A small region in which spontaneous magnetization has a fixed direction is called a magnetic domain.

A ferromagnetic material is applied widely to various magnetic devices including various magnetic recording systems and magnetic sensors. Efforts have been made for the development of various ferromagnetic materials suitable for different purposes. In the field of magnetic recording, in particular, the reduction in size of magnetic domains and the realization of recording of a minimum unit by a smallest possible number of magnetic domains are important problems. Although a plurality of magnetic domains serve as a recording unit in current magnetic recording, it is desirable to use a single magnetic domain as a recording unit when all is said and done, and it is desirable to reduce the size of magnetic domains each for a recording unit.

A method of making a ferromagnetic material having small magnetic domains employing electron beam lithography is disclosed in, for example, Journal of Applied Physics, Vol. 76, pp. 6673–6675 (1994). This method forms a region of several tens nanometer square of magnetic atoms on a nonmagnetic substrate, i.e., a material not displaying ferromagnetism. It is reported in this paper that the region displays ferromagnetism in a single magnetic domain in some cases. Magnetic atoms are atoms which display ferromagnetism in single bulk, such as those of 3d transition metals including Cr, Mn, Fe, Co and Ni, and lanthanides including Ce, Pr, Nd, Pm, Sm, Eu, Gd, Tb, Dy, Ho, Er and Tm.

A region of a ferromagnetic material of a size on the order of the foregoing size can be formed by depositing the ferromagnetic material on a nonmagnetic substrate with the probe of a scanning tunneling microscope (STM) as mentioned in, for example, Journal of Applied Physics, Vol. 76, pp. 6656–6660 (1994).

SUMMARY OF THE INVENTION

Further miniaturization can not be successfully achieved simply by reducing the size of the region of a magnetic material by the direct application of the foregoing two methods. Reason for it will be explained in terms of the Stoner's model which is used for explaining ordinary bulky ferromagnetic materials, such as Fe, Co and Ni. As mentioned in Tokyo Daigaku Bussei Kenkyu-jo, "Bussei Kagaku Jiten", pp. 198–200, Tokyo Shoseki (1996), the Stoner's model expresses a condition for displaying ferromagnetism (Stoner condition) by $U \times D(Ef) > 1$, where U is electron correlation energy or energy of Coulomb repulsion between electrons, and $D(Ef)$ is electronic density of states at Fermi level. A substance must have a very large density of states $D(Ef)$ on a Fermi surface to be ferromagnetic. However, if a minute atomic cluster system or a fine atom wire system is formed by a ferromagnetic material meeting the Stoner condition, the density of states $D(Ef)$ is reduced greatly by a finite size effect and, consequently, the Stoner condition cannot be met and it is highly possible that the spontaneous magnetization of the system disappears.

Accordingly, a novel idea entirely different from conventional ideas is necessary to realize a ferromagnetic material which makes possible a further smaller single magnetic domain.

Accordingly, it is an object of the present invention to provide a ferromagnetic material from which spontaneous magnetization does not disappear even if the magnetic domain is further miniaturized.

A second object of the present invention is to provide a magnetic head capable of controlling a magnetic field created by a minute magnetic head comprising an atomic group or a fine atom wire formed on a surface of a solid by applying voltage to the surface of the solid as contrasted with a recording system which supplies a current to an electromagnetic induction magnetic head.

A third object of the present invention is to provide a magnetoresistance effect element including a fine wire having a function similar to that of a magnetoresistance device in a spin valve or a magnetic multilayer film (or an artificial super lattice of magnetic/nonmagnetic metals) or a function analogous to the magnetoresistance effect of ferromagnetic tunnel junction.

To solve the foregoing problems, the present invention utilizes a fact that the atomic arrangement and the electronic state of a surface of a solid, and an atom or an atomic group (including molecules) on a surface of a solid are different from those of a bulk, i.e., a macroscopic object. Ferromagnetism is displayed by properly arranging atoms on a surface of a substrate. It is a feature of the present invention that ferromagnetism is displayed by using only nonmagnetic atoms. Nonmagnetic atoms are those excluding the previously defined magnetic atoms and atoms of rare gases (He, Ne, Ar, Kr, Xe and Rn).

As mentioned above, according to the Stoner's model, the condition for displaying ferromagnetism, i.e., the Stoner condition, is expressed by $U \times D(Ef) > 1$, where U is electron correlation energy or energy of Coulomb repulsion between electrons, and $D(Ef)$ is electronic density of states at Fermi level. Therefore, even substances which are nonmagnetic in a bulk state can be made to display ferromagnetism if the Stoner condition: $U \times D(Ef) > 1$ can be met by properly arranging atoms on a surface of a substrate. For example, the appearance of spontaneous magnetization at an end of a graphite ribbon is theoretically predicted in, for example, Journal of Physical Society of Japan, Vol. 65, pp. 1920–1923 (1996). However, this structure has not been realized as yet.

DESCRIPTION OF THE PREFERRED EMBODIMENTS

Figure 1A:
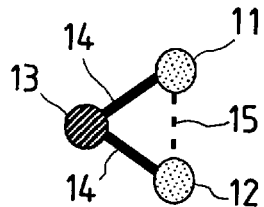
FIG. 1A is a typical view of a basic unit structure of a ferromagnetic material.

According to the present invention, a ferromagnetic material is formed by arranging basic unit structures each consisting of nonmagnetic atoms or atomic groups arranged on a surface of a nonmagnetic substrate. Nonmagnetic atoms of the same kind or different kinds are arranged on a surface of a nonmagnetic substrate as shown in FIG. 1A by fine processing techniques of an atomic level, such as an atomic manipulation technique employing a STM. The basic unit structure shown in FIG. 1A has an atom 11, an atom 12 of the same kind as the atom 11, and an atom 13 of the same kind as the atom 11 or of a kind different from that of the atom 11. The atom 13 may be replaced with a molecule, i.e., an atomic group. Each atom or each atomic group may be an atom or a molecule forming the substrate or may be an external atom or an external molecule disposed on the substrate. The atoms 11 and 12 and the atom (or the atomic group) 13 are arranged so that chemical bonds indicated by solid lines 14 are formed between the atom 11 and the atom (or the atomic group) 13 and between the atom 12 and the atom (or the atomic group) 13 are chemical bonds, and an electron path indicated by a broken line 15 is formed between the atoms 11 and 12. If the basic unit structure includes an odd number of atoms which do not participate in forming chemical bonds, the basic unit structure has an electronic density of states as typically shown in FIG. 2. Although the shape of the electronic density of states is dependent on the type of the atoms and the arrangement of the atoms, the density of states has a peak at a point near the Fermi level. Since the electronic state density has the peak, the Stoner condition is satisfied and ferromagnetism is displayed. A ferromagnetic material can be constructed by the single base unit or by arranging a plurality of basic unit structures like that shown in FIG. 1A as shown FIGS. 1B or 1C. In the following description of various ferromagnetic materials embodying the present invention, atoms of the same kind are represented by the same mark, and only the representative one of the atoms of the same kind is indicated at a reference character. Incidentally, a circle with small dots represents the constituent atoms of a substrate, a circle with parallel oblique lines sloping down to the left represents atoms placed on a surface of the substrate, and a small solid circle indicates terminal atoms or hydrogen atoms, i.e., molecule adsorbates.

First Embodiment

Figure 3A:
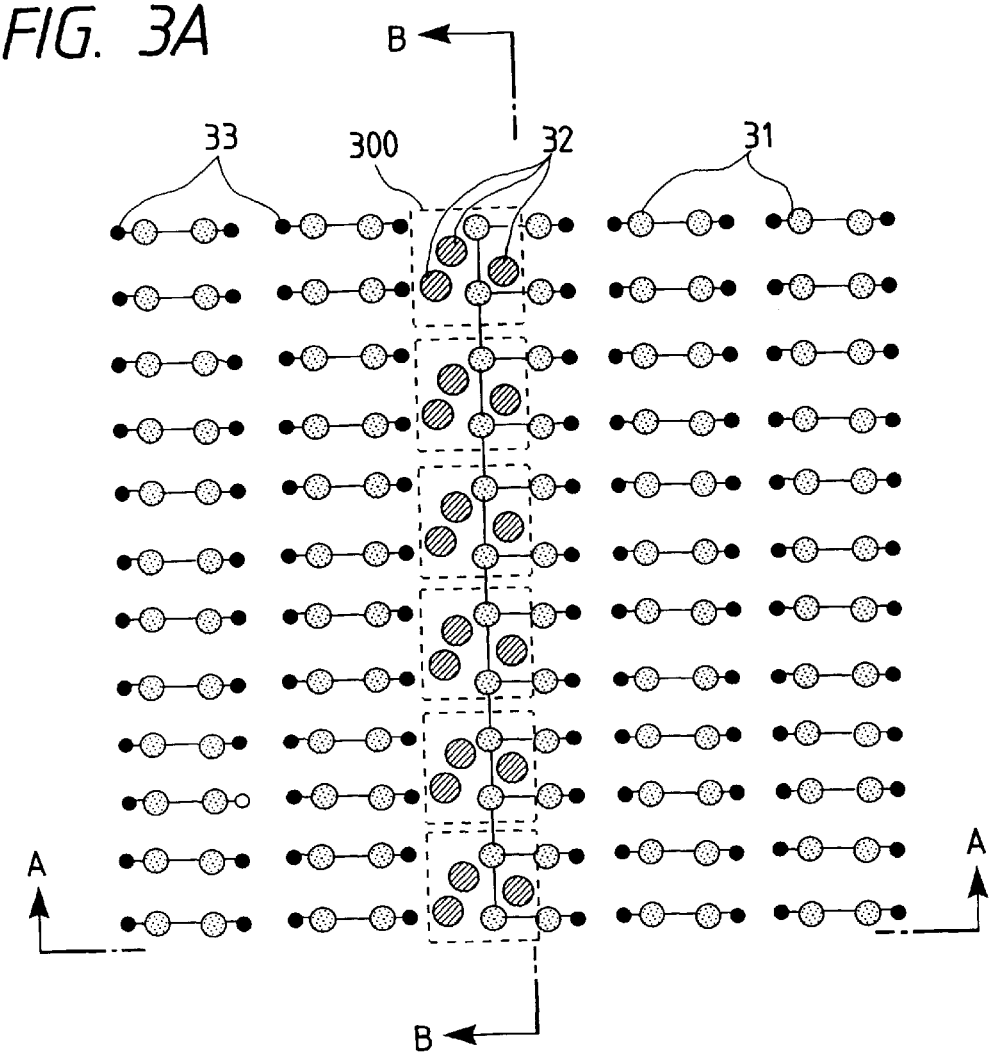
FIG. 3A is a typical plan view of an atomic arrangement in a ferromagnetic material in a first embodiment according to the present invention.
Figure 3B:
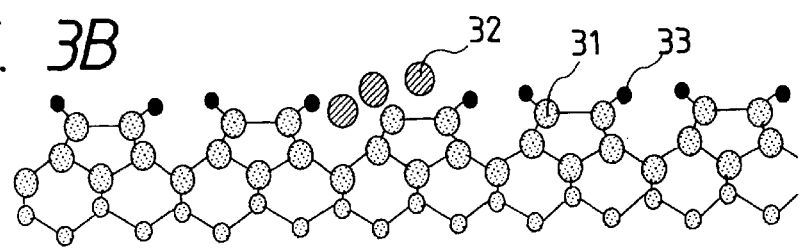
FIG. 3B is a typical side view of a portion of the atomic arrangement near a surface taken in the direction of the arrows A in FIG. 3A.
Figure 3C:
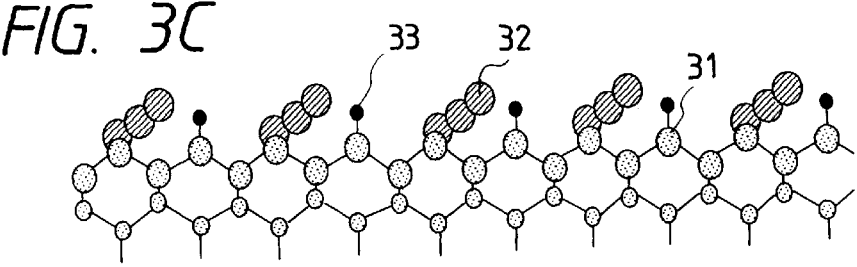
FIG. 3C is a typical sectional view of a portion of the atomic arrangement near a surface taken on line B—B in FIG. 3A.

FIG. 3A is a typical plan view of an atomic arrangement in a ferromagnetic material in a first embodiment according to the present invention, FIG. 3B is a typical side view of a portion of the atomic arrangement near a surface taken in the direction of the arrows A in FIG. 3A, and FIG. 3C is a typical sectional view of a portion of the atomic arrangement near a surface taken on line B—B in FIG. 3A.

In this embodiment, the (100) surface of a Si substrate, i.e., a nonmagnetic substrate, is used. All the dangling bonds of Si atoms 31 on the surface of the Si substrate are terminated by hydrogen atoms 33 to obtain chemically inactive, stable surface structure, the probe of a STM are held close to the hydrogen-terminated surface of the Si substrate, and one row of dangling Si bonds in a fine line was formed by extracting one row of hydrogen atoms by applying appropriate voltage pulses to the probe. Since the row of dangling Si bonds is chemically more active than the hydrogen-terminated Si surface structure, Ga atoms 32 could be made to be selectively adsorbed by the row of dangling Si bonds by utilizing a thermal evaporation source. A procedure including the foregoing steps is the same as that mentioned in Japanese Journal Applied Physics Letters, Vol. 35, pp. 1085–1088 (1996).

In this embodiment, the Ga atoms 32 are made to be adsorbed gradually so that the number of the adsorbed Ga atoms is 1.5 times the number of the dangling bonds as shown in FIG. 3A. In FIG. 3A, lines between the Si atoms 31 and between the Si atoms 31 and the hydrogen atoms 33 indicate chemical bonds. Regions 300 enclosed by broken lines in the surface structure thus formed by arranging the atoms by evaporation correspond to the basic unit shown in FIG. 1A. The Si atoms 31, i.e., the constituent atoms of the substrate, correspond to the atoms 11 and 12 of the basic unit structure shown in FIG. 1A. These atoms are the constituent atoms of the substrate remaining after the terminal hydrogen atoms 33 have been extracted by the foregoing operation. The three nonmagnetic Ga atoms 32 correspond to the atom (or the atomic group) 13 shown in FIG. 1A. In FIG. 3A, the atomic group consisting of the three Ga atoms 32 and the constituent atoms 31 of the substrate are chemically bonded together. An electron path extends between the atoms 31 via the atomic group of the Ga atoms 32 and another electron path extends between the atoms 31 through the substrate. Therefore, this example has a magnetic domain structure shown in FIG. 1B.

Figure 4:
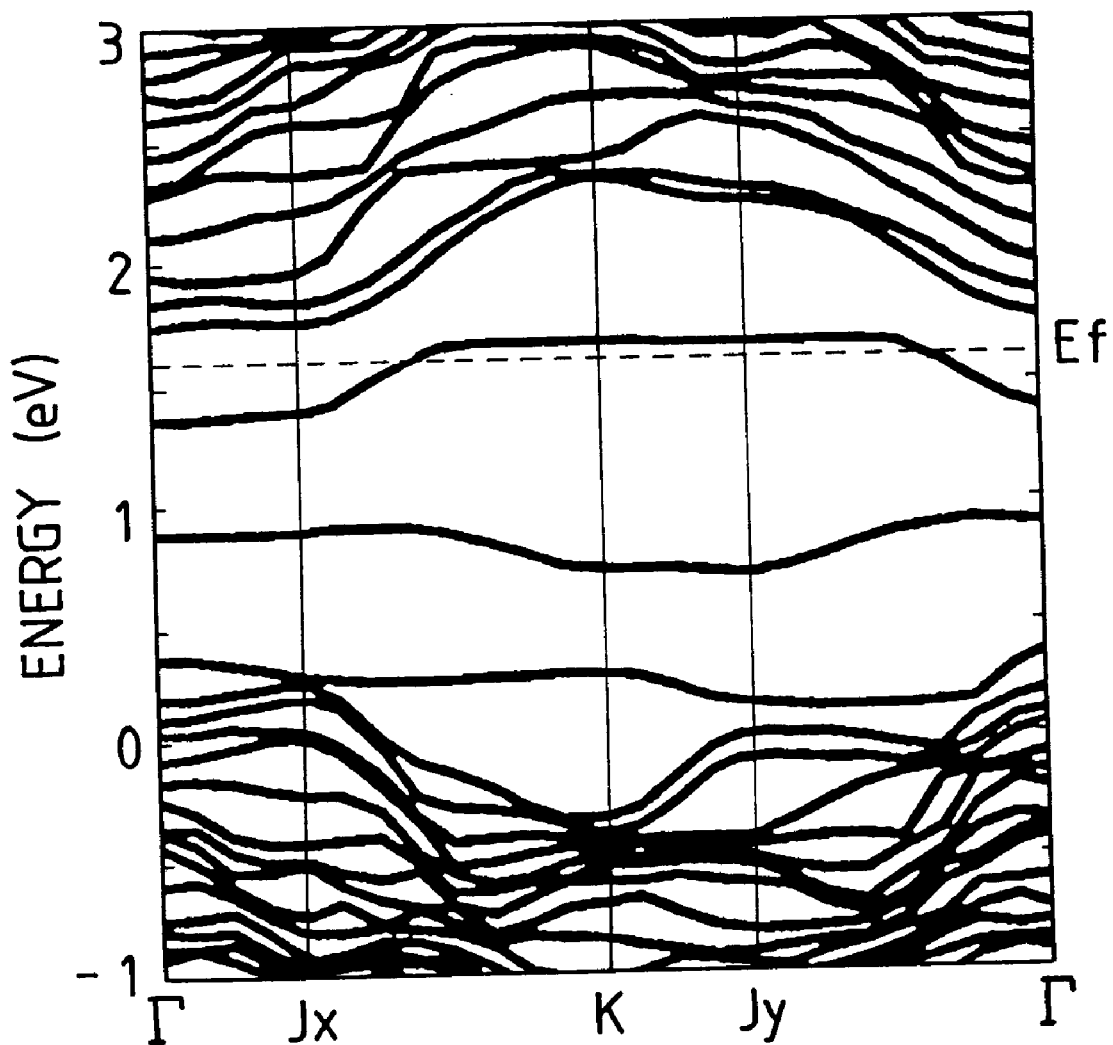
FIG. 4 is a diagrammatic view of an energy band structure in the atomic arrangement of FIG. 3A.

This structure has an energy band structure as shown in FIG. 4, which is known from first-principles calculation based on a local density functional method. In FIG. 4, a range between Γ and Jy shows energy dispersion relation in a direction parallel to the row of the basic unit structures. To put it differently, this direction is expressed by a direction of electrical conduction in the structure consisting of the basic unit structures; that is, the rows of magnetic domain in this structure are conductive. As is obvious from FIG. 4, the energy band has a flat section in this direction in the vicinity of Fermi level Ef. Therefore, a peak electronic state density appears at a position near the Fermi level as typically shown in FIG. 2. Therefore, the structure is expected to display ferromagnetism. Although the resolution of the current scanning magnetic force microscope (MFM) or the current spin scanning electron microscope (spin SEM) is not fine enough to enable the direct observation of the surface magnetic domain structure, it is conjectured from the results of scanning tunnel spectroscopic experiments that the regions adsorbing Ga atoms may be magnetized and the direction of magnetization may be aligned with the fine line of Ga atoms. The results of experiments based on scanning tunnel spectroscopy (STS) proved that the electronic state density has a peak at a position near the Fermi level. The length of the fine line is dependent on the length of a region from which hydrogen atoms are extracted. The shortest fine line corresponds to the basic unit structure 300 shown in FIG. 3A. It is obvious that long lines can be fabricated by the same method.

Although the constituent atoms 31 of the substrate are Si atoms in this embodiment, a substrate of a semiconductor, such as Ge or GaAs, or an insulating material, such as NaCl, may be used. Although the dangling bonds in the surface of the substrate are terminated by hydrogen atoms 33 in this embodiment, the dangling bonds can be effectively terminated by atoms other than hydrogen atoms or by molecules, such as methyl groups. Although the reduction of chemical activity by the termination of dangling bonds is very effective in facilitating processing, chemical activity need not necessarily be reduced. Actually, a structure similar to that shown in FIG. 3A can be formed by a processing method which makes the probe of a STM adsorb a small amount of Ga atoms, holds the probe holding the Ga atoms close to the surface of a substrate and applies a pulse voltage to the probe to transfer the Ga atoms from the probe to the surface of the substrate. If the substrate is thus processed, the dangling bonds are not terminated by hydrogen atoms and the arrangement of Ga atoms is somewhat different from that shown in FIG. 3A, but there is not any hindrance to displaying ferromagnetism.

The nonmagnetic atoms 32 may be atoms of a trivalent metal that belongs to group III in the periodic table of elements, such as B, Al, In or Tl, or those of a plurality of kinds of metals instead of Ga atoms. For example, a structure similar to that shown in FIG. 3A and capable of displaying ferromagnetism can be constructed by forming a row of dangling bonds on a hydrogen-terminated Si substrate, depositing a number of Ga atoms equal to the number of dangling bonds on the Si substrate, and depositing Al atoms equal to half the number of dangling bonds on the Si substrate.

A ferromagnetic material can be produced by using nonmagnetic atoms of a metal of a valence other than those of a trivalent metal. For example, a structure formed by depositing a number of Ca atoms, i.e., bivalent atoms, equal to the number of dangling bonds on a substrate and depositing a number of Ga atoms equal to half the number of dangling bonds displays ferromagnetism. The arrangement of the atoms on the surface of the thus processed substrate is not necessarily the same as that shown in FIG. 3A.

It is essential that the structure has basic units corresponding to the structure shown in FIG. 1A, and each basic unit structure has an odd number of electrons which does not take part in chemical bonding. More specifically, the arrangement of the atoms may be dependent on the kinds and the numbers of the atoms and the surface structure of the substrate.

It is effective in protecting the ferromagnetic structure to cover the surface of the substrate with an insulating material or a semiconductor so that such ferromagnetic material may not be exposed on the surface of the substrate after constructing the ferromagnetic structure on the substrate.

Although the ferromagnetic material in this embodiment is produced without using any magnetic atoms at all, the ferromagnetic material may contain magnetic atoms as an impurity within or in the vicinity of the ferromagnetic structure, provided that the ferromagnetic material has basic unit structures corresponding to that shown in FIG. 1A and each basic unit structure has an odd number of electrons which do not take part in chemical bonding.

Second Embodiment

Figure 5A:
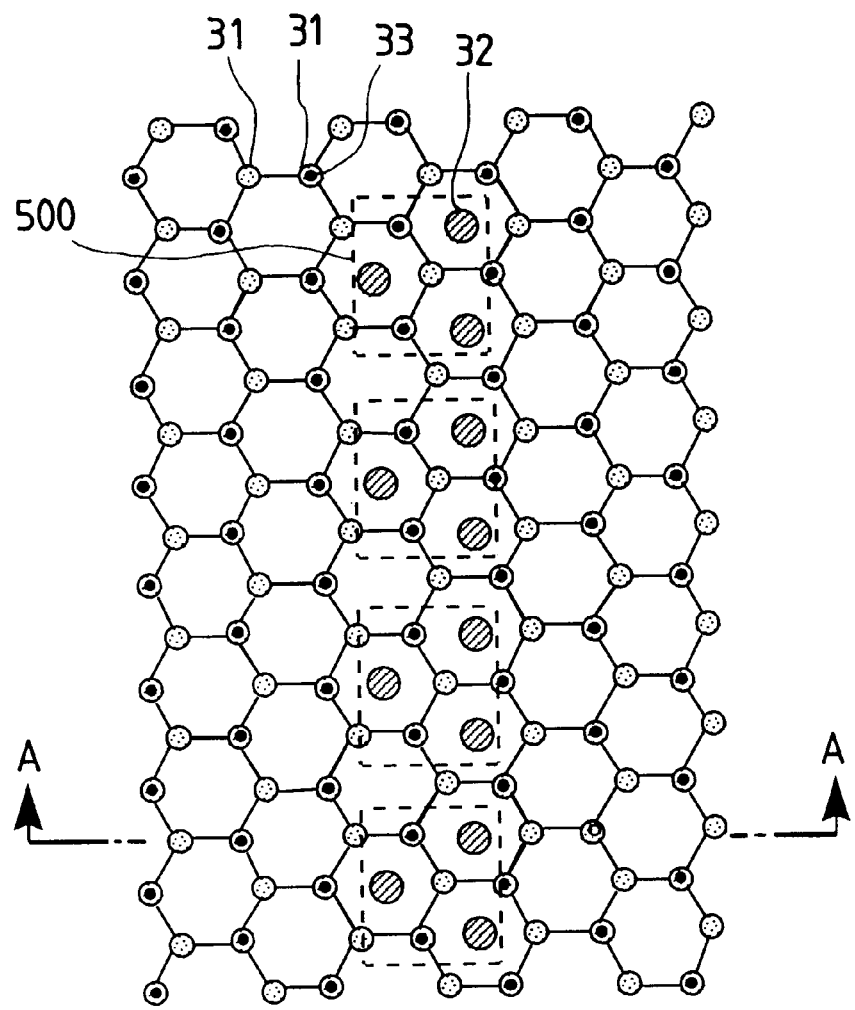
FIG. 5A is a typical plan view of an atomic arrangement in a ferromagnetic material in a second embodiment according to the present invention.
Figure 5B:
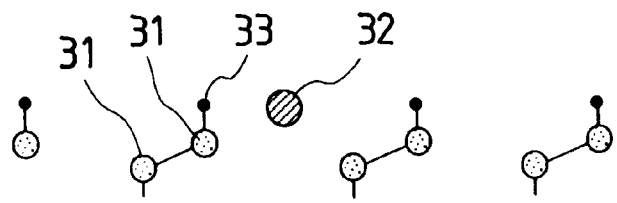
FIG. 5B is a typical sectional view of a portion of the atomic arrangement near a surface taken on line A—A in FIG. 5A.

Referring to FIGS. 5A and 5B, a ferromagnetic material in a second embodiment according to the present invention is constructed by using a (111) surface of a hydrogen-terminated Si substrate without forming a row of dangling bonds.

The (111) surface of the hydrogen-terminated Si substrate is kept at a temperature of 80 K, Ga atoms 32 are deposited on the surface of the Si substrate, the Ga atoms 32 are moved with the probe of a STM to form a structure as shown in FIGS. 5A and 5B. In this structure, components corresponding to the atoms 11 and 12 and the atom (or the atomic group) 13 of the structure shown in FIG. 1A are nonmagnetic atoms 32, i.e., Ga atoms. The constituent atoms 31 of the substrate need not necessarily be Si atoms, the nonmagnetic atoms 32 need not necessarily be Ga atoms, and the terminating atoms (or molecules) 33 need not necessarily be hydrogen atoms (or molecules). The second embodiment, similarly to the first embodiment, may employ various kinds of atoms other than the foregoing atoms.

Figure 6A:
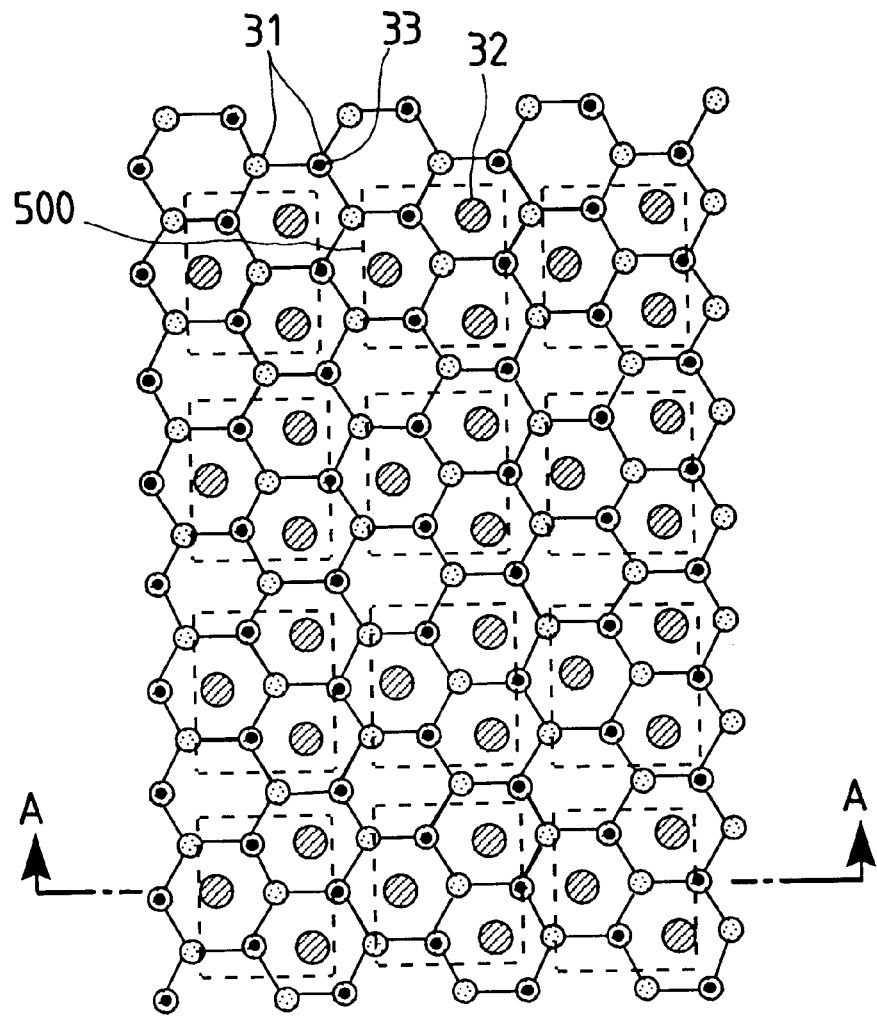
FIG. 6A is a typical plan view of an atomic arrangement in a ferromagnetic material embodying to the present invention.
Figure 6B:
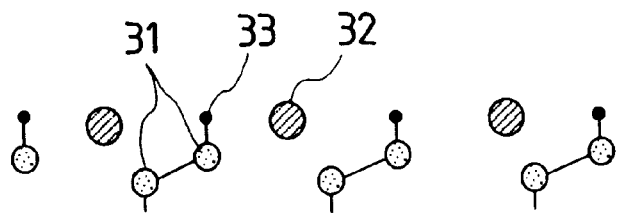
FIG. 6B is a typical sectional view of a portion of the atomic arrangement near a surface taken on line A—A in FIG. 6A.

A structure shown in FIGS. 6A and 6B is constructed by arranging three structures each being similar to the structure shown in FIGS. 5A and 5B in three parallel rows. The principle of magnetization of the structure shown in FIGS. 6A and 6B is the same as that of the structure shown in FIGS. 5A and 5B, and the same structure is able to form a magnetic domain of a large area.

Figure 1B:
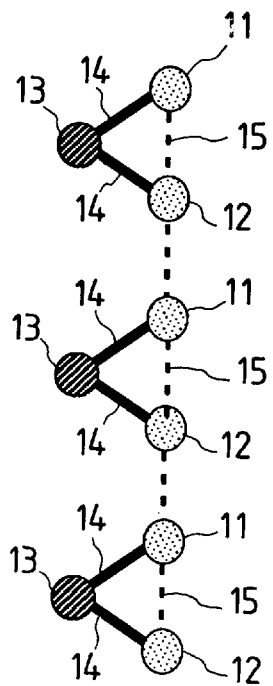
FIGS. 1B and 1C are typical views of ferromagnetic structures formed by cascading a plurality of basic unit structures like that shown in FIG. 1A.
Figure 1C:
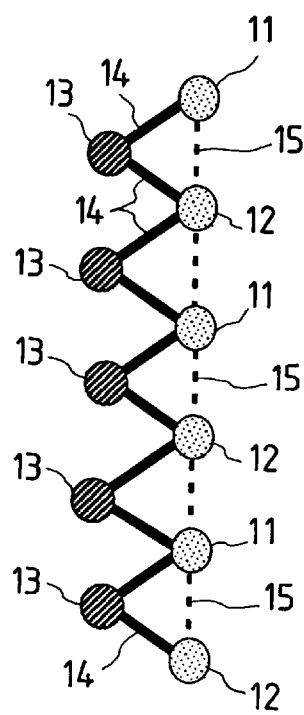
Figure 2:
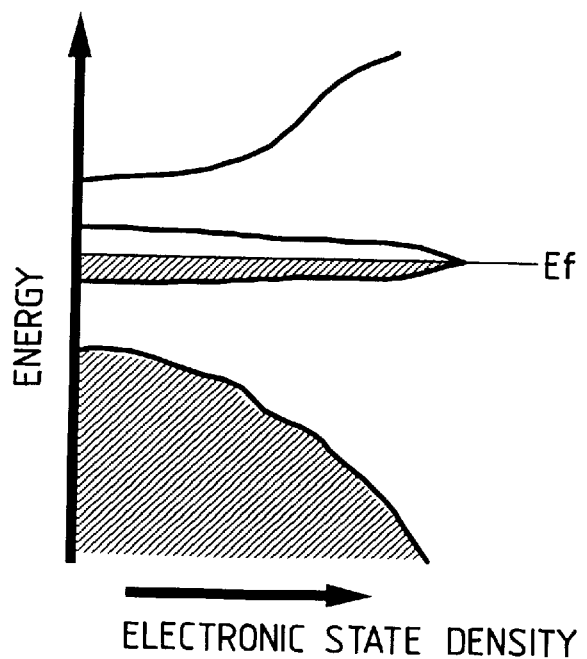
FIG. 2 is a typical view of the electronic density of states corresponding to the basic unit of a ferromagnetic material shown in FIG. 1A.
Figure 7A:
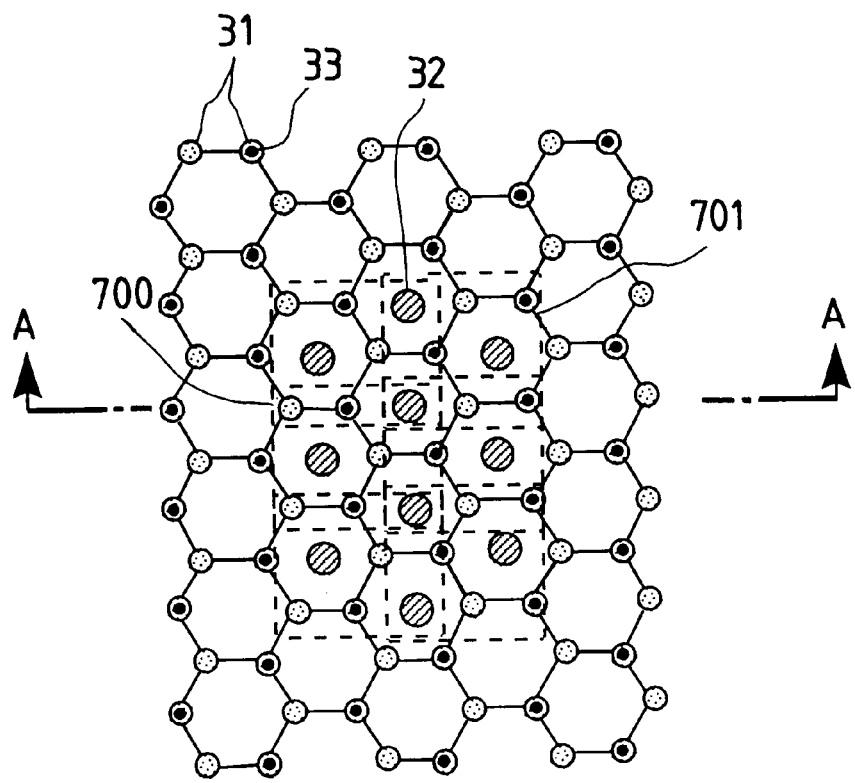
FIG. 7A is a typical plan view of an atomic arrangement in a ferromagnetic material embodying the present invention.
Figure 7B:
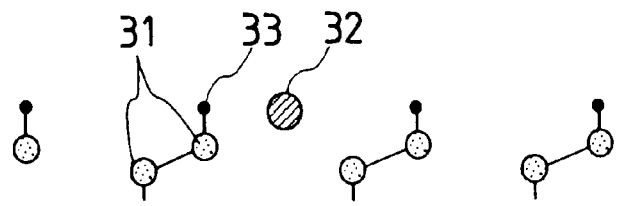
FIG. 7B is a typical sectional view of a portion of the atomic arrangement near a surface taken on line A—A in FIG. 7A.

A structure shown in FIGS. 7A and 7B is similar to that shown in FIGS. 6A and 6B. The structure shown in FIGS. 7A and 7B is constructed by arranging two rows of magnetic domain in parallel to each other with the adjacent basic unit structures on the two rows of magnetic domain sharing two nonmagnetic atoms 32. The principle of magnetization of the structure shown in FIGS. 7A and 7B is the same as that of the structure shown in FIGS. 5A and 5B, and the same structure is able to form a magnetic domain of a large area. When arranging a plurality of basic unit structures of the magnetic domain shown in FIG. 1A, the basic unit structures need not necessarily be arranged on a straight line as shown in FIGS. 1B or 1C, but may be arranged in a zigzag arrangement or a circular arrangement resembling a circular arc. The basic unit structures need not necessarily be arranged in a linear arrangement, but may be arranged two-dimensionally as shown in FIGS. 5A and 5B, FIGS. 6A and 6B or FIGS. 7A and 7B. FIGS. 5A, 6A and 7A are plan views of the structures of the ferromagnetic materials embodying the present invention formed by arranging atoms, and FIGS. 5B, 6B and 7B are typical sectional views of portions of the structures near the surface taken on line A—A in FIGS. 5A, 6A and 7A.

It is effective in protecting the foregoing structure to cover the surface of the substrate with a protective means, as was mentioned in the first embodiment. The structure, similarly to that of the first embodiment, is capable of displaying ferromagnetism even if the same contains magnetic atoms as an impurity.

Third Embodiment

Figure 8A:
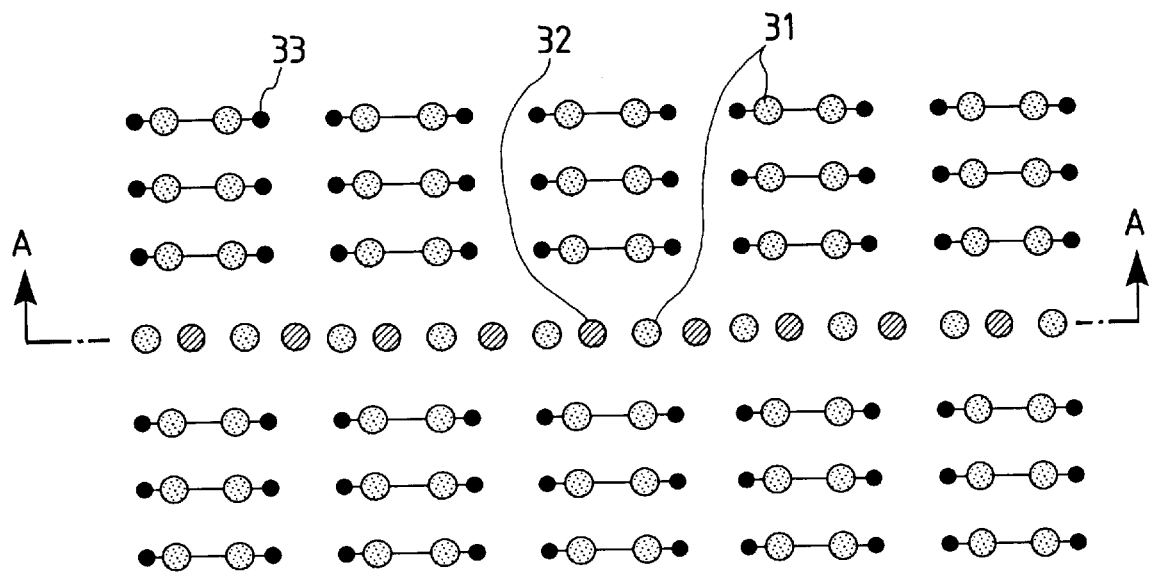
FIG. 8A is a typical plan view of an atomic arrangement in a ferromagnetic material in a third embodiment according to the present invention.
Figure 8B:
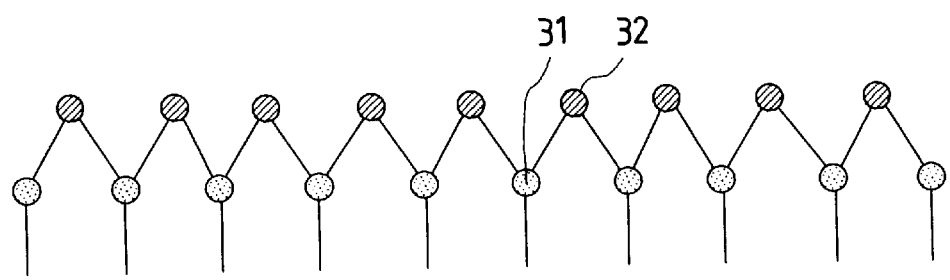
FIG. 8B is a typical sectional view of a portion of the atomic arrangement near a surface taken on line A—A in FIG. 8A.

FIG. 8A is a plan view of an atomic arrangement in a ferromagnetic material in a third embodiment according to the present invention, in which basic unit structures of a magnetic domain are arranged in an arrangement corresponding to that shown in FIG. 1C. FIG. 8B is a typical sectional view of a portion of the atomic arrangement near a surface taken on line A—A in FIG. 8A.

The ferromagnetic material in this embodiment can be produced by extracting hydrogen atoms on a row perpendicular to rows of Si dimers on the surface of a (100) surface of a hydrogen-terminated Si substrate, bringing a STM probe holding Ga atoms close to the surface of the Si substrate, and applying an appropriate pulse voltage to the probe. Measurement by STS showed that the electronic state density in a structure shown in FIG. 8A has a peak at a position near the Fermi level, and it was inferred from this measurement that the structure displays ferromagnetism. In this structure, the constituent atoms 31 of the Si substrate, i.e., Si atoms, correspond to the atoms 11 and 12 of the structure shown in FIG. 1A, and the nonmagnetic atoms 32, i.e., Ga atoms, correspond to the atoms (or atomic groups) 13 of the structure shown in FIG. 1A. Therefore, it is obvious that the basic unit structures of the structure shown in FIG. 8A are arranged in the same arrangement as that shown in FIG. 1C. This embodiment, similarly to the foregoing embodiments, the constituent atoms 31 of the substrate, the nonmagnetic atoms 32 and the terminating atoms (or molecules) need not necessarily limited to Si atoms, Ga atoms and hydrogen atoms (molecules), respectively.

Fourth Embodiment

Since the magnetic domain of the basic unit structures shown in FIG. 1A is ferromagnetic and conductive as mentioned above, the rows of magnetic domains of the structure shown in FIG. 3A is ferromagnetic and conductive.

Figure 9A:
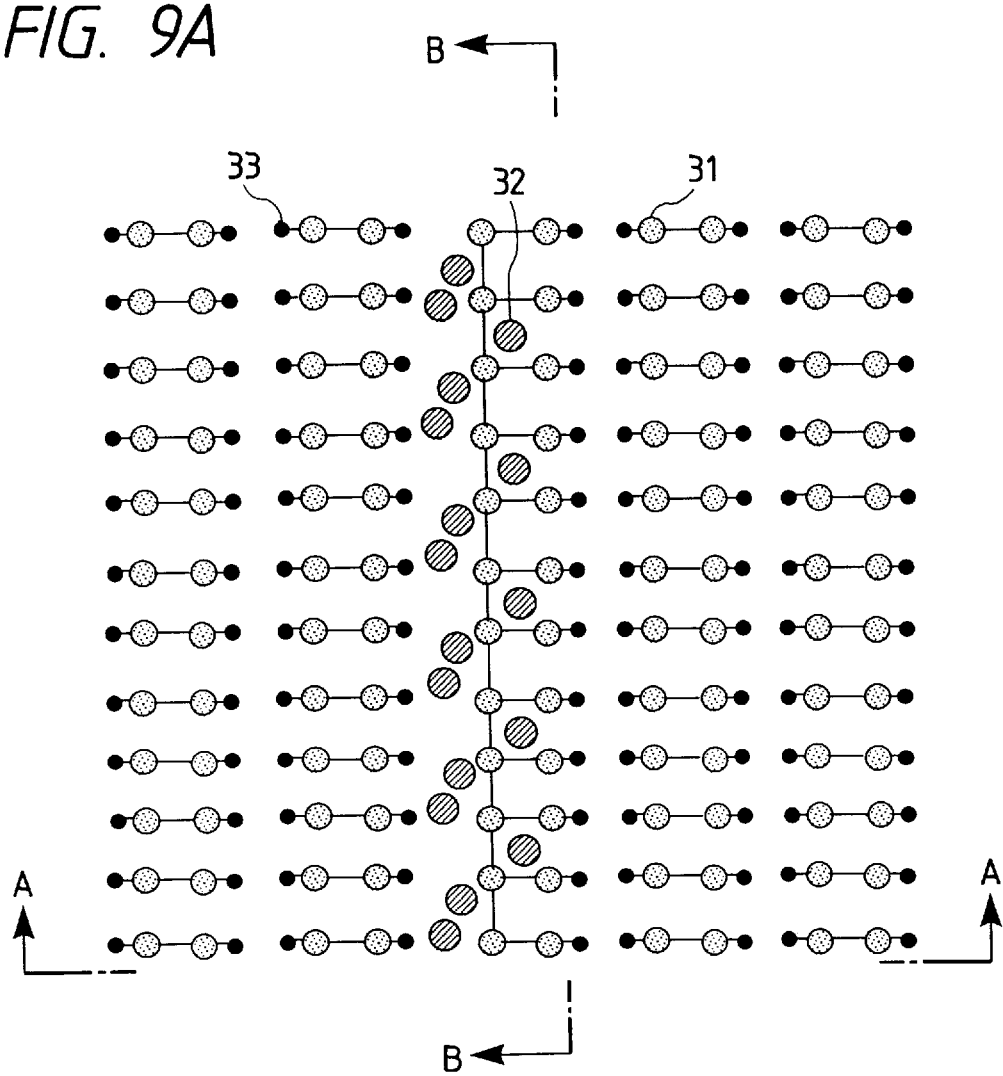
FIG. 9A is a typical plan view of an atomic arrangement in a ferromagnetic material in a fourth embodiment according to the present invention.
Figure 9B:
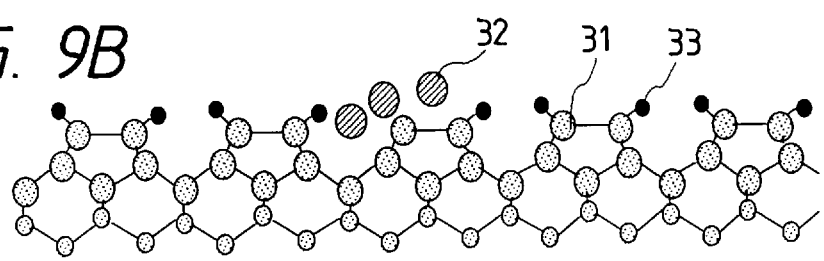
FIG. 9B is a typical side view of a portion of the atomic arrangement near a surface taken in the direction of the arrows A in FIG. 9A.
Figure 9C:
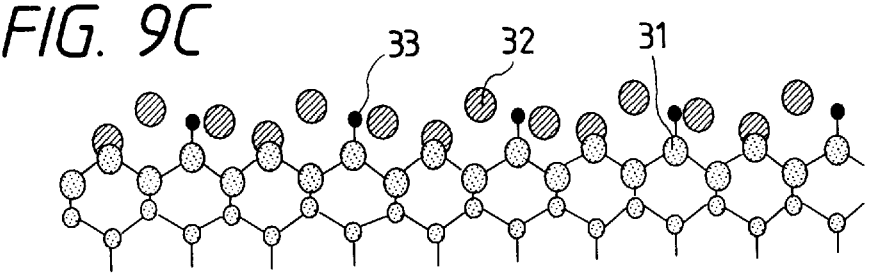
FIG. 9C is a typical sectional view of a portion of the atomic arrangement near a surface taken on line B—B in FIG. 9A.

FIG. 9A is a plan view of a structure of a nonmagnetic material quite analogous with that shown in FIG. 3A but differs from the latter in the arrangement of nonmagnetic atoms 33. This structure does not have a flat portion in a energy band in the vicinity of the Fermi level Ef as shown in FIG. 4, and the electronic state density does not have any peak as typically shown in FIG. 2 at a position near the Fermi level. The structure shown in FIG. 9A is conductive and is a nonmagnetic fine line. FIG. 9B is a typical side view of a portion of the atomic arrangement near a surface taken in the direction of the arrows A in FIG. 9A, and FIG. 9C is a typical sectional view of a portion of the atomic arrangement near a surface taken on line B—B in FIG. 9A.

Figure 10:
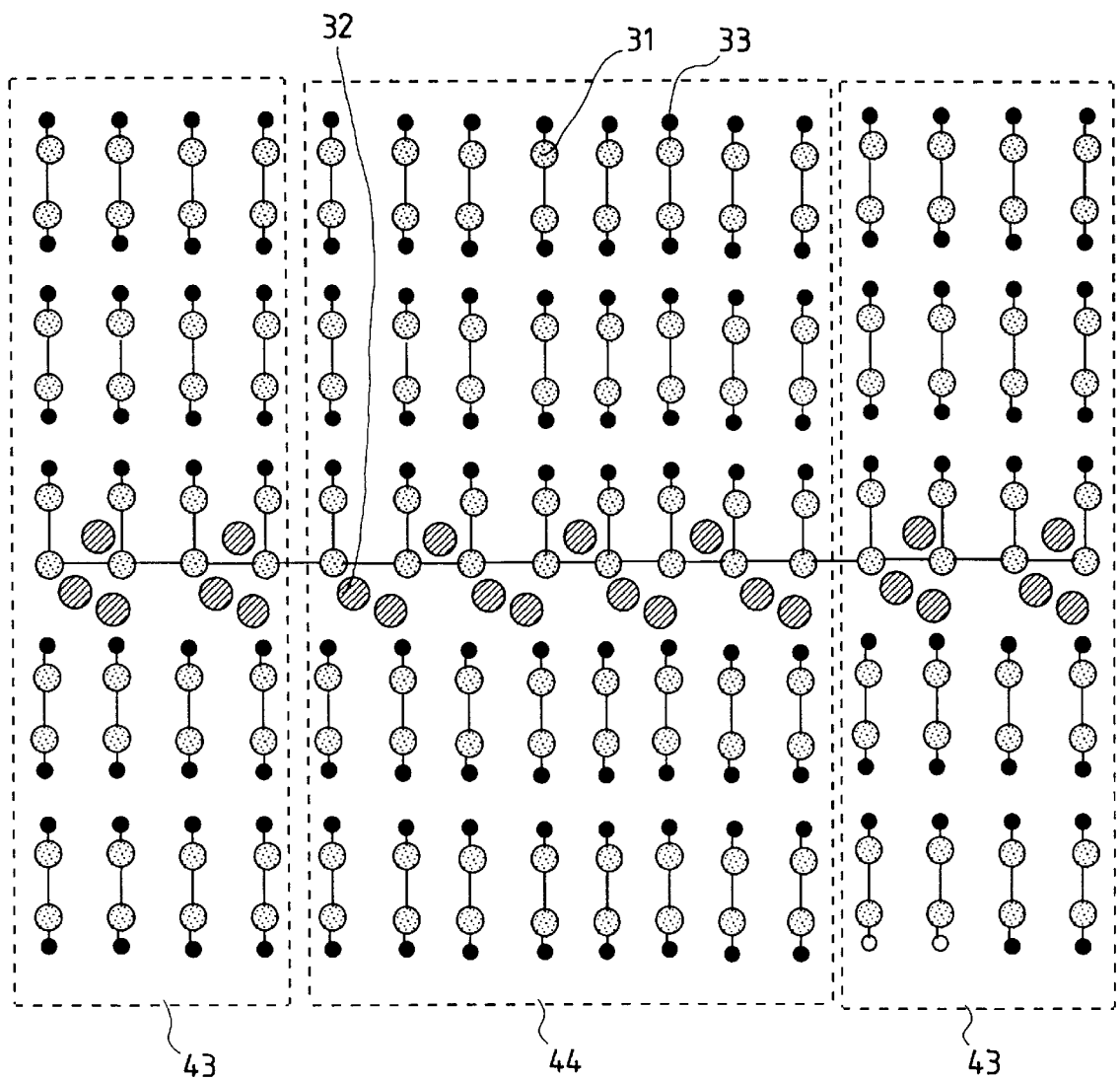
FIG. 10 is a typical plan view of an atomic arrangement in a magnetoresistance effect element embodying the present invention constructed by alternately arranging the ferromagnetic structure shown in FIG. 3A and the nonmagnetic structure of shown in FIG. 9A.

FIG. 10 shows a typical plan view of the structure of a magnetoresistance effect element constructed by alternately arranging ferromagnetic regions 43 of fine conductive lines of a structure like that shown in FIG. 3A and a nonmagnetic region 44 of conductive fine lines of a structure like that shown in FIG. 9A. Atoms of the structures 43 and 44 shown in FIG. 10 correspond to those of the structure shown in 3A and those of the structure shown in FIG. 9A, respectively. In this embodiment, the length of a nonmagnetic region between the two ferromagnetic regions is 12 Å to couple the two ferromagnetic regions antiferromagnetically. In this magnetoresistance effect element, the ferromagnetic region 43, the nonmagnetic region 44 and the ferromagnetic region 43 are cascaded on the surface of a semiconductor substrate. An electric current flows through the magnetoresistance effect element when a voltage is applied across the opposite ends of the magnetoresistance effect element, and the intensity of the current varies according to the intensity of an external magnetic field applied to the magnetoresistance effect element. Therefore, a magnetism-detecting head employing the magnetoresistance effect element of this embodiment can be used for reading information from a magnetic recording medium.

A fine line of atoms disclosed in, for example, U.S. Pat. No. 5,561,300 or U.S. Pat. No. 5,694,059 may be used for applying a voltage to the fine line of this embodiment or for sending out a signal.

Although this embodiment employs a fine line of the structure containing Ga atoms shown in FIGS. 3A and 9A in the ferromagnetic regions 43 and the nonmagnetic region 44, any suitable structure of other atoms or molecules may be used instead of the fine line of the structure containing Ga atoms, provided that the structure is nonmagnetic and conductive and is capable of antiferromagnetically coupling the two ferromagnetic regions.

In the magnetoresistance effect element in this embodiment, the ferromagnetic regions 43 are 10 Å in length and the nonmagnetic region 44 is 9 Å in length.

Therefore, the ferromagnetic regions 43 which is superparamagnetic at a room temperature was ferromagnetic at a low temperature of 2.1 K.

Fifth Embodiment (Embodiment of 3196037843)

Figure 11:
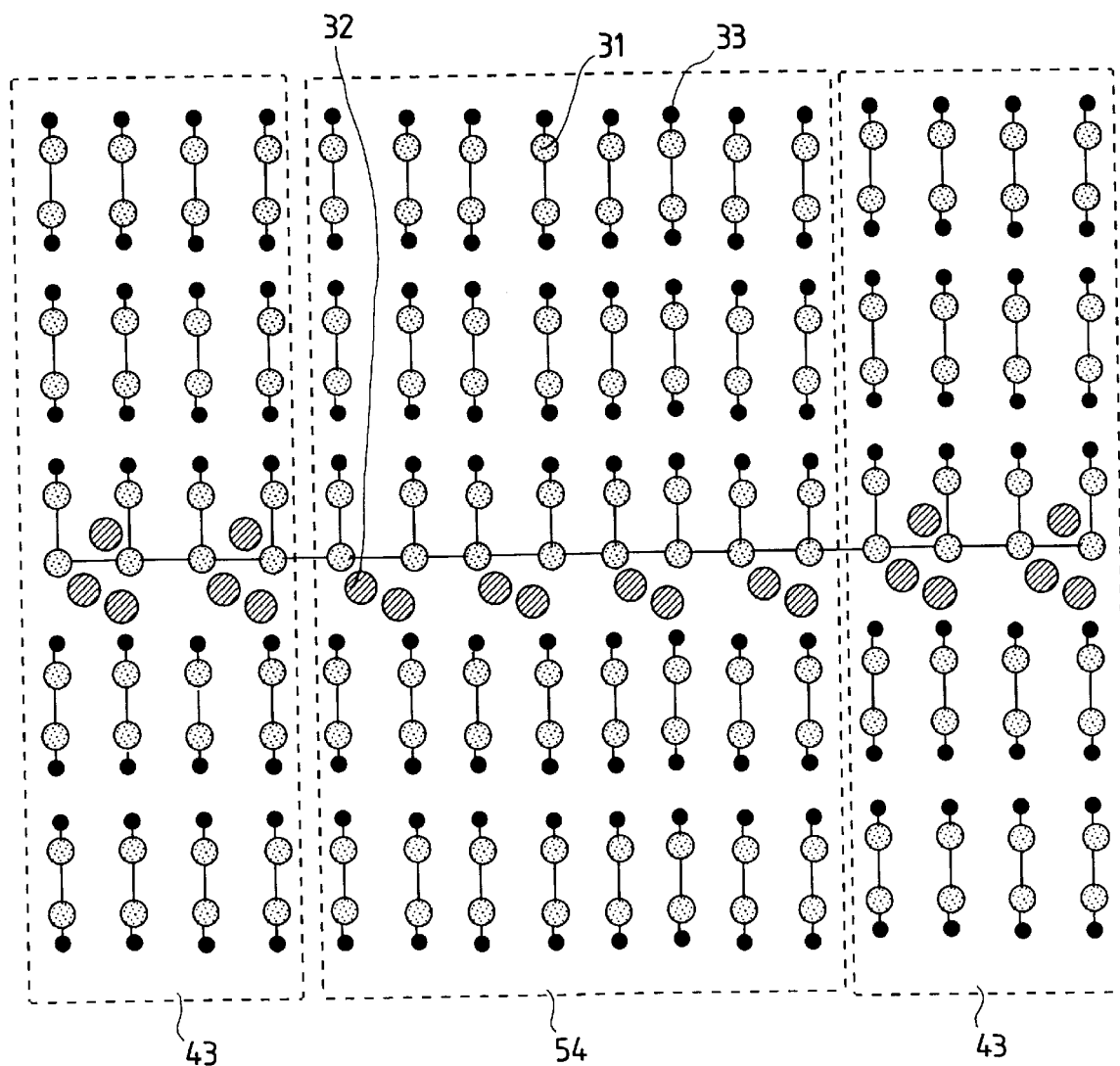
FIG. 11 is a typical plan view of an arrangement of a magnetoresistance effect element in a modification of the magnetoresistance effect element shown in FIG. 10.

FIG. 11 shows the structure of a magnetoresistance effect element constructed by alternately arranging ferromagnetic regions 43 of fine conductive lines of a structure like that shown in FIG. 3A and a nonmagnetic region 54 which resembles conductive fine lines of the structure shown in FIG. 9A. The region 54 of the structure resembling that of the nonmagnetic, conductive fine lines shown in FIG. 9A is the same as the structure shown in FIG. 9A except that the number of Ga atoms included in each basic unit structure of the nonmagnetic region 54 of the magnetoresistance effect element of FIG. 11 is less than that of Ga atoms included in each basic unit structure of the nonmagnetic region 44 of the magnetoresistance effect element of FIG. 9A by one. The structure shown in FIG. 11, similarly to that shown in FIG. 9A, is nonmagnetic, and this fine line is nonconductive. The atoms of the structure shown in FIG. 11 are the same as those previously described with reference to FIGS. 3A and 9A.

Measurement of the region 54 by scanning tunnel spectroscopy (STS) showed that the nonmagnetic, nonconductive region has an energy gap of about 1 eV. The length of the nonmagnetic region is 12 Å to couple the two ferromagnetic regions on the opposite sides of the nonmagnetic, nonconductive region antiferromagnetically. In this magnetoresistance effect element, the ferromagnetic region 43, the nonmagnetic, nonconductive region 54 and the ferromagnetic region 43 are cascaded on a surface of a semiconductor substrate, and a tunnel current flows through the fine line only when a voltage applied to the opposite ends is higher than a critical voltage. The intensity of the tunnel current is dependent on the intensity of an external magnetic field applied to the magnetoresistance effect element. If a magnetic head for reading information from a magnetic recording medium is fabricated by using the magnetoresistance effect element of this embodiment, information can be read from a magnetic recording medium by applying a voltage thats cause a tunnel current to flow to the magnetic head when necessary.

Although this embodiment employs a fine line of the structure containing Ga atoms in the ferromagnetic regions 43 and the nonmagnetic, nonconductive region 54, any suitable structure of other atoms or molecules may be used instead of the fine line of the structure containing Ga atoms, provided that the structure is nonmagnetic and conductive and is capable of antiferromagnetically connecting the two ferromagnetic regions.

A fine line of atoms disclosed in, for example, U.S. Pat. No. 5,561,300 or U.S. Pat. No. 5,694,059 may be used for applying a voltage to the fine line of this embodiment or for picking up a signal.

Sixth Embodiment (Embodiment of 319603742)

Figure 12:
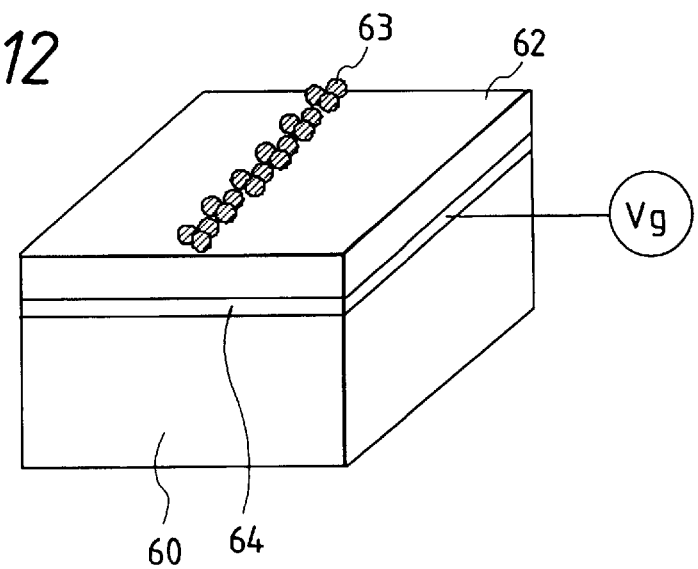
FIG. 12 is a perspective view of a magnetic recording head for one storage unit, in a preferred embodiment according to the present invention, employing the structure of the ferromagnetic material shown in FIG. 3A.
Figure 13:
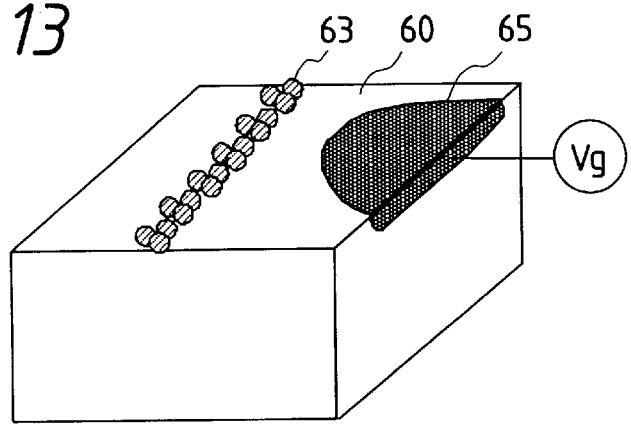
FIG. 13 is a perspective view of a magnetic recording head for one storage element, in another preferred embodiment according to the present invention, employing the structure of the ferromagnetic material shown in FIG. 3A.

FIGS. 12 and 13 show very small magnetic devices employing the ferromagnetic structure shown in FIG. 3A in preferred embodiments according to the present invention. In each of the very small magnetic devices, a fine line 63 of Ga atoms of the structure shown in FIG. 3A is formed on a (100) surface of a Si substrate. The magnetic device shown in FIG. 12 is fabricated by depositing an Au thin film 64 by evaporation on a surface of a Si substrate 60, attaching a Si substrate 62 of a thickness on the order of micrometers to the Au thin film 64 so that its (100) surface is exposed, and forming the fine line 63 of a ferromagnetic structure as shown FIG. 3A on the (100) surface. The magnetic device shown in FIG. 13 is fabricated by forming a fine wire of a ferromagnetic structure as shown in FIG. 3A on a (100) surface of a Si substrate 60, and forming a gate electrode 65 close to fine line of the ferromagnetic structure with a small space on the order of micrometers between the fine line 63 and the gate electrode 65.

Figure 14:
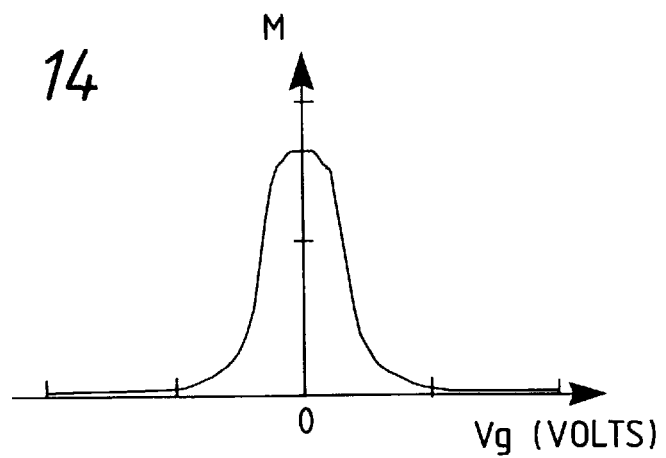
FIG. 14 is a diagram showing the variation of expected magnetic characteristics of the magnetic recording heads of FIGS. 12 and 13 with voltage applied to the gate electrode.

FIG. 14 shows the voltage-magnetization characteristics of the magnetic devices shown in FIGS. 12 and 13. In FIG. 14, the potential of the Au thin film 64 or the gate electrode 65 relative to the fine line 63 is measured on the horizontal axis, and value of magnetization is measured on the vertical axis. As is obvious from the voltage-magnetization characteristics, the value M of magnetization of the fine line 63 of Ga atoms varies according to the variation of the voltage Vg applied to the gate electrode 64 or 65 in a fixed range, and the magnetization of the fine line 63 of Ga atoms can be controlled by properly determining the gate voltage Vg. The direction of spontaneous magnetization (spin) is parallel to the fine line 63 of Ga atoms. By a magnetization control method using a gate voltage effect of this structure, a minute magnetic recording spot on the order of several hundreds angstroms can be formed on the surface of a magnetic recording medium, by means of a recording operation similar to that of an ordinary bulk magnetic recording head.

Seventh Embodiment

Figure 15:
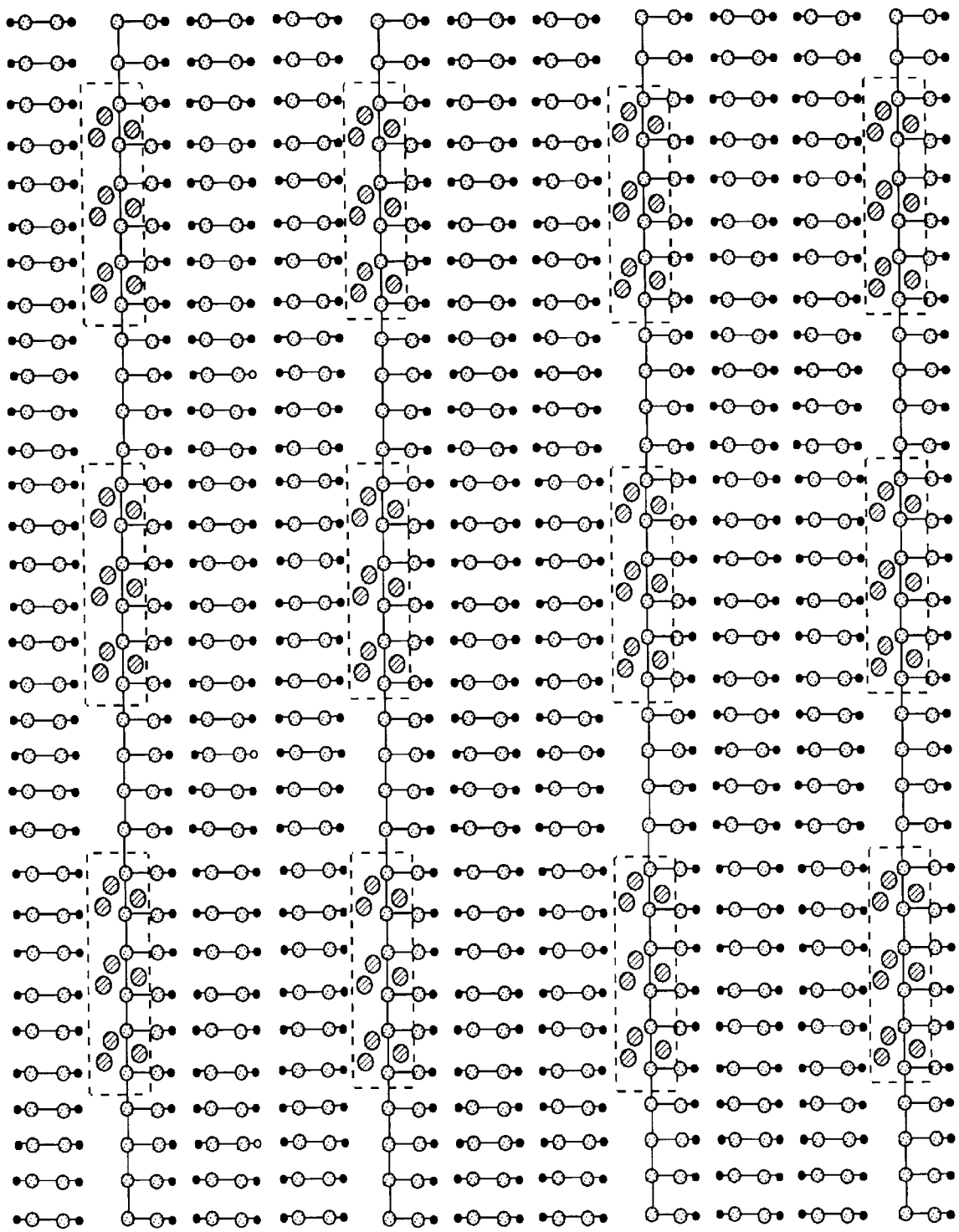
FIG. 15 is a typical plan view of an atomic arrangement in a magnetic recording medium embodying the present invention employing the structure of the ferromagnetic material of FIG. 3A.

FIG. 15 is a typical plan view of an atomic arrangement in a magnetic recording medium embodying the present invention employing the structure of the ferromagnetic material of FIG. 3A, in which reference characters are omitted for simplicity. In FIG. 15, the same marks as those used in FIG. 3A represent the same atoms, respectively. Atomic fine lines enclosed by broken lines are ferromagnetic. The atomic fine lines are magnetized or demagnetized by a magnetic recording head shown in FIG. 12 or 13. Information can be read from the recording medium by detecting the state of magnetization of the atomic fine lines by a magnetic head provided with the magnetoresistance effect element shown in FIGS. 10 or 11.

Eighth Embodiment

Figure 16:
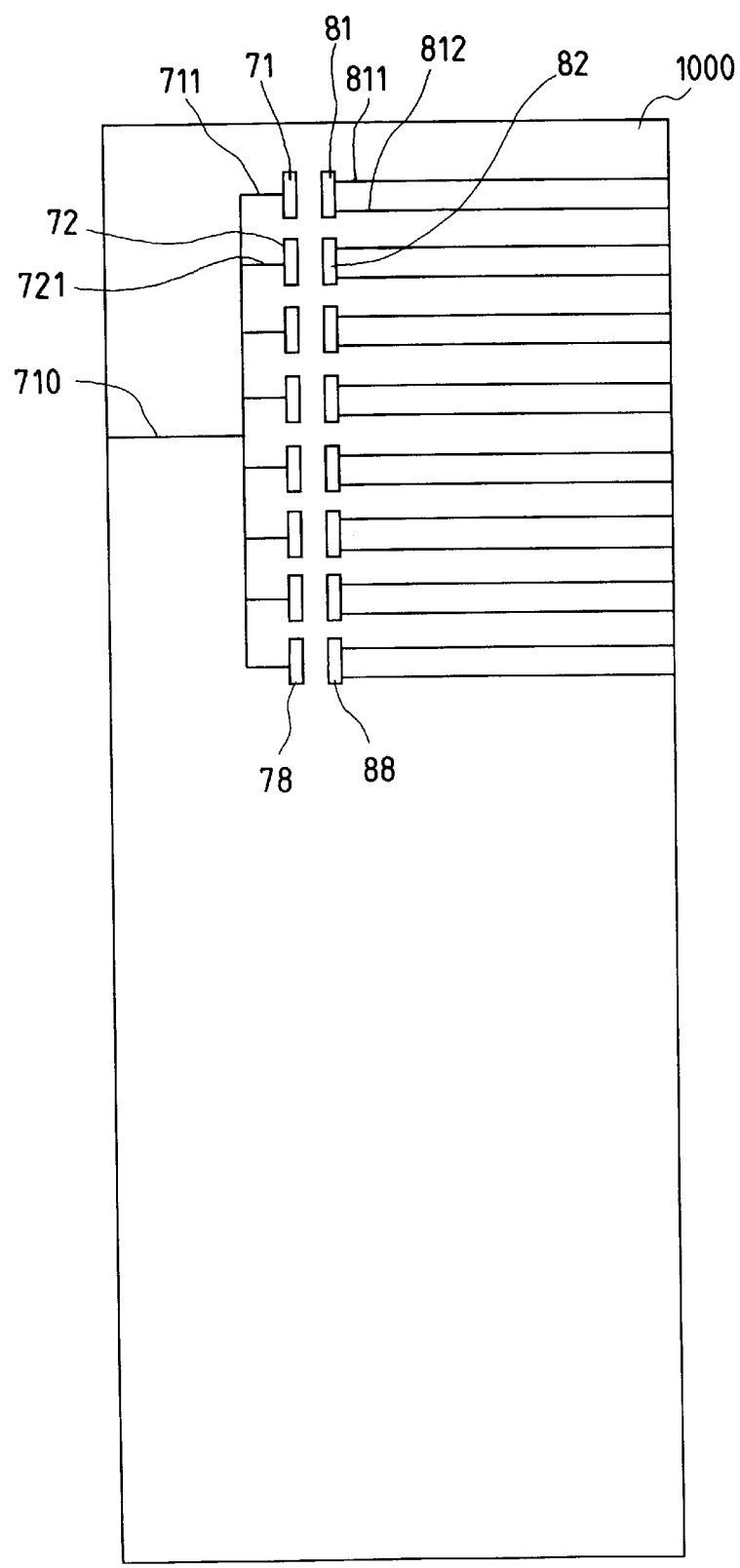
FIG. 16 is a typical plan view of an atomic arrangement in a surface of a magnetic recording head for one byte, which was constructed by employing the magnetic recording head for one storage unit shown in FIG. 13, facing a magnetic recording medium.
Figure 17:
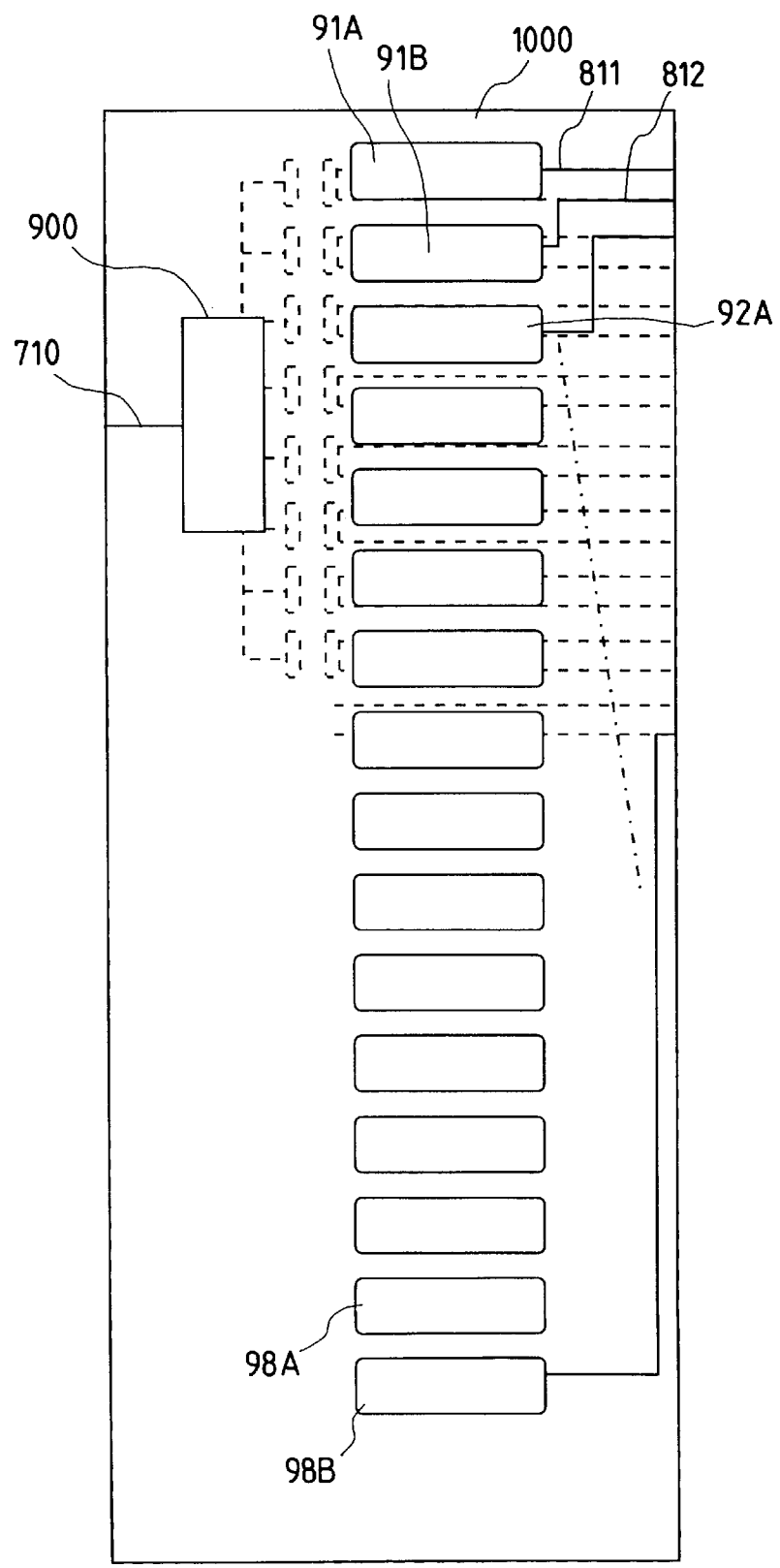
FIG. 17 is a rear view of the magnetic recording head shown in FIG. 16.

FIGS. 16 and 17 are a front view and a rear view, respectively, of a portion of a magnetic recording head for use in combination with a recording medium like that shown in FIG. 15 to be disposed opposite to the recording medium. In FIGS. 16 and 17, reference numerals 71, 72, . . . , and 78 indicate atomic fine lines of the ferromagnetic structure shown in FIG. 3, and reference numerals 81, 82, . . . , and 88 indicate atomic fine lines forming the magnetoresistance effect element shown in FIG. 10. The atomic fine lines are arranged at intervals equal to those between the longitudinal rows of the magnetic domains of the ferromagnetic material of the recording medium shown in FIG. 15 to write or read one byte of information at a time. As mentioned previously in connection with FIGS. 12 and 13, the atomic fine lines 71, 72, . . . , and 78 of the ferromagnetic structure and the atomic fine lines 81, 82, . . . , and 88 forming the magnetoresistance effect elements are arranged in parallel rows spaced a distance on the order of micrometers apart. Terminal pads 91A and 91B are connected to the magnetoresistance effect element 81 to connect the magnetoresistance effect element 81 to an external device. Terminal pads 92A and 92B, 93A and 93B, . . . , and 98A and 98B are connected to the magnetoresistance effect elements 82, 83, . . . , and 88 to connect the magnetoresistance effect elements 82, 83, . . . , and 88 to the external device. A terminal pad 900 is connected to the atomic fine lines 71, 72, . . . , and 78 of the ferromagnetic structure. Wiring lines 811, 812, ..., 711, 721, ..., and 710 connecting the atomic fine lines to the terminal pads may be wiring lines extending from the front surface to the back surface by using the atomic fine lines disclosed in U.S. Pat. No. 5,561,300 or U.S. Pat. No. 5,694,059.

Information can be recorded on the recording medium by, for example, the following magnetic recording method. The terminal pad 900 is connected to a reference potential, the magnetoresistance effect elements 81 to 88 are set at appropriate potentials corresponding to information to be recorded on the recording medium. Consequently, some of the atomic fine lines 71 to 78 of the ferromagnetic structure are magnetized and the rest are not magnetized as described previously in connection with FIG. 14, whereby the recording elements of the recording medium are magnetized according to information to be recorded, in which the recording elements of the recording medium corresponding to the magnetized atomic fine lines are magnetized and those of the same corresponding to not magnetized atomic fine lines are not magnetized.

Information recorded on the recording medium can be read by, for example, the following magnetic information reading operation. The electrical resistances of the magnetoresistance effect elements 81 to 88 are dependent on the intensity of magnetic field applied thereto. Therefore, currents of intensities corresponding to the magnetically recorded information flow through the magnetoresistance effect elements 81 to 88 when an appropriate voltage is applied to the terminal pads connected to the magnetoresistance effect elements 81 to 88 and hence the information can be read by measuring the currents which flow through the magnetoresistance effect elements 81 to 88.

As is apparent from the foregoing description, according to the present invention, ferromagnetic materials and very small magnetic devices can be constructed by using atoms of specific kinds in combination and properly arranging those atoms.

What is claimed is:

1. A ferromagnetic material comprising basic unit structures each consisting of three nonmagnetic atoms or molecules on substrate material of nonmagnetic atoms; wherein, in each of the basic unit structures, the atoms or molecules are positioned so that a chemical bond is formed between a first atom or molecule and a third atom or molecule, a chemical bond is formed between a second atom or molecule and the third atom or molecule, a chemical bond or an electron path not passing the third atom is formed between the first atom or molecule and the second atom or molecule, and an electronic density of states has a peak at a position near the Fermi level, said ferromagnetic material exhibiting ferromagnetism.

2. A ferromagnetic material according to claim 1, wherein each of the basic unit structures consists of first and second atoms or molecules of the same kind, and a third atom or molecule of the same kind as the first and the second atoms or of a kind different from that of the first and the second atom.

3. A ferromagnetic material according to claim 1, wherein the three nonmagnetic atoms or molecules are positioned so that an energy band dispersion in the direction of electrical conduction has a flat section in the vicinity of the Fermi level.

4. A ferromagnetic material according to claim 1, wherein the first atom or molecule and the second atom or molecule are constituent atoms or molecules of a substrate which includes the substrate material.

5. A ferromagnetic material according to claim 4, wherein the first and second atoms or molecules are in the surface of the substrate, and wherein the two chemical bonds, between the first atom or molecule and the third atom or molecule and between the second atom or molecule and the third atom or molecule, respectively, are formed between the atom or an atomic group and first and second atoms in the surface of the substrate.

6. A ferromagnetic material according to claim 1, wherein the substrate material is a semiconductor or an insulating material.

7. A ferromagnetic material according to claim 4, wherein the substrate is made of a semiconductor or an insulating material.

8. A ferromagnetic material according to claim 1, wherein the substrate material is a semiconductor substrate or an insulating substrate made nonconductive by terminating all dangling bonds in a surface thereof with atoms or molecules.

9. A ferromagnetic material according to claim 4, wherein the substrate is a semiconductor substrate or an insulating substrate made nonconductive by terminating all dangling bonds in a surface thereof with atoms or molecules.

10. A ferromagnetic material according to claim 1, wherein the substrate material is a semiconductor material or an insulating material made nonconductive by terminating all dangling bonds in a surface thereof with atoms or molecules, some of the terminating atoms are removed, and atoms of the same kind or atoms of a plurality of kinds are substituted for the removed terminating atoms.

11. A ferromagnetic material according to claim 4, wherein the substrate is a semiconductor substrate or an insulating substrate made nonconductive by terminating all dangling bonds in a surface thereof with atoms or molecules, some of the terminating atoms are removed, and atoms of the same kind or atoms of a plurality of kinds are substituted for the removed terminating atoms.

12. A ferromagnetic material according to claim 1, wherein nonmagnetic atoms or atomic groups of different kinds are buried in a nonmagnetic substance.

13. A ferromagnetic material according to claim 4, wherein nonmagnetic atoms or atomic groups of different kinds are buried in a nonmagnetic substance.

14. A magnetic device comprising:
   a ferromagnetic material, exhibiting ferromagnetism, comprising basic unit structures each consisting of three nonmagnetic atoms or molecules on a substrate material of nonmagnetic atoms, the atoms or molecules being positioned so that a chemical bond is formed between a first atom or molecule and a third atom or molecule, a chemical bond is formed between a second atom or molecule and the third atom or molecule, and a chemical bond or an electron path not passing the third atom is formed between the first atom or molecule and the second atom or molecule in each of the basic unit structures, and an electronic density of states has a peak at a position near the Fermi level; and
   a conductive material disposed so as to be able to apply an electric field to the ferromagnetic material;
   wherein an electron spin state is switched between a paramagnetic state and a ferromagnetic state by the electric field applied to the ferromagnetic material by the conductive material.

15. A magnetic device according to claim 14, wherein the ferromagnetic material is formed on one surface of a semiconductor or insulating substrate, and the conductive material for applying the electric field to the ferromagnetic material is formed on the other surface of the semiconductor or insulating substrate.

16. A magnetic device according to claim 14, wherein the ferromagnetic material and the conductive material for applying an electric field to the ferromagnetic material are formed on the same surface of a semiconductor or insulating substrate.

17. A magnetoresistance effect element comprising:

a substrate of nonmagnetic atoms;

cascaded regions of a ferromagnetic material, exhibiting ferromagnetism, comprising basic unit structures each consisting of three nonmagnetic atoms or molecules on the substrate, the atoms or molecules being positioned so that a chemical bond is formed between a first atom or molecule and a third atom or molecule, a chemical bond is formed between a second atom or molecule and the third atom or molecule, and a chemical bond or an electron path not passing the third atom is formed between the first atom or molecule and the second atom or molecule in each of the basic unit structures, and an electronic density of states has a peak at a position near the Fermi level; and cascaded regions of a nonmagnetic material comprising basic unit structures each consisting of a plurality of atoms arranged so that the density of states does not have any peak in the vicinity of the Fermi level, the position of one of those atoms being different from that of the atom of the basic unit structure of the ferromagnetic material.

18. A magnetoresistance effect element comprising:

a substrate of nonmagnetic atoms;

cascaded regions of a ferromagnetic material, exhibiting ferromagnetism, comprising basic unit structures each consisting of three nonmagnetic atoms or molecules on the substrate, the atoms or molecules being positioned so that a chemical bond is formed between a first atom or molecule and a third atom or molecule, a chemical bond is formed between a second atom or molecule and the third atom or molecule, and a chemical bond or an electron path not passing the third atom is formed between the first atom or molecule and the second atom or molecule in each of the basic unit structures, and an electronic density of states has a peak at a position near the Fermi level; and cascaded regions of a nonmagnetic material comprising basic unit structures each consisting of a plurality of atoms arranged so that the density of states does not have any peak in the vicinity of the Fermi level and the basic unit structure is nonconductive, the number of the atoms of the basic unit structure being less than that of the atoms of the basic unit structure of the ferromagnetic material by one.

19. A ferromagnetic material according to claim 4, wherein the substrate material is selected from the group consisting of Si, Ge, GaAs and NaCl.

20. A ferromagnetic material according to claim 4, wherein each of the basic unit structures has an odd number of electrons which do not take part in chemical bonding.

21. A ferromagnetic material according to claim 1, wherein the substrate material is selected from the group consisting of Si, Ge, GaAs and NaCl.

22. A ferromagnetic material according to claim 1, wherein each of the basic unit structures has an odd number of electrons which do not take part in chemical bonding.

23. A ferromagnetic material comprising:

an Si substrate with a row of dangling bonds constructed by extracting H atoms along an Si dimer row from the H-terminated (100) surface of the Si substrate; and a molecule of three Ga atoms arranged on the surface of said substrate, wherein chemical bonds are substantially formed between the molecule and two adjacent dangling bonds only so that an electronic density of states of an area of the two adjacent dangling bonds and the molecule has a peak at a position near the Fermi level.

24. A ferromagnetic material comprising:

an Si substrate with a row of dangling bonds constructed by extracting H atoms along a perpendicular direction of an Si dimer row from the H-terminated (100) surface of the Si substrate; and a plurality of Ga atoms arranged along the dangling bonds on the surface of said substrate, wherein chemical bonds are substantially formed between each of the Ga atoms and each of adjacent two dangling bonds corresponding to each other only so that an electronic density of states of an area of the two adjacent dangling bonds and the Ga atom has a peak at a position near the Fermi level.

25. A ferromagnetic material comprising:

an Si substrate with an H-terminated (111) surface and without forming any dangling bonds in the surface; and three Ga atoms arranged and adsorbed on each center of triangular three hexagonal unit-cells of the hexagonal lattice of said surface, wherein an electronic density of states of an area of the Ga atoms has a peak at a position near the Fermi level.

26. A ferromagnetic material comprising:

an Si substrate with an H-terminated (111) surface and without any dangling bonds in the surface; and three nonmagnetic atoms arranged and adsorbed on each center of triangular three hexagonal unit-cells of the hexagonal lattice of said surface, wherein an electronic density of states of an area of the nonmagnetic atoms has a peak at a position near the Fermi level.

* * * * *